(12) United States Patent
Nishiuchi et al.

(10) Patent No.: US 11,041,975 B2
(45) Date of Patent: Jun. 22, 2021

(54) MULTIPLE-OPTICAL-AXIS PHOTOELECTRIC SENSOR

(71) Applicant: OMRON Corporation, Kyoto (JP)

(72) Inventors: Satoshi Nishiuchi, Takatsuki (JP); Shunkichi Sasaki, Osaka (JP); Nobuchika Takiguchi, Moriyama (JP); Keisaku Kikuchi, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/642,039

(22) PCT Filed: Jan. 28, 2019

(86) PCT No.: PCT/JP2019/002637
§ 371 (c)(1),
(2) Date: Feb. 26, 2020

(87) PCT Pub. No.: WO2019/171813
PCT Pub. Date: Sep. 12, 2019

(65) Prior Publication Data
US 2021/0080611 A1  Mar. 18, 2021

(30) Foreign Application Priority Data
Mar. 7, 2018 (JP) .............................. JP2018-041080

(51) Int. Cl.
*G01V 8/20* (2006.01)
*G01J 1/02* (2006.01)
(52) U.S. Cl.
CPC .............. *G01V 8/20* (2013.01); *G01J 1/0271* (2013.01)

(58) Field of Classification Search
CPC ......... G01V 8/20; G01J 1/0271; G01J 1/0407
(Continued)

(56) References Cited

U.S. PATENT DOCUMENTS

| 2009/0001298 A1 | 1/2009 | Deguchi |
| 2012/0112049 A1 | 5/2012 | Shimokawa et al. |

(Continued)

FOREIGN PATENT DOCUMENTS

| JP | 4628402 B2 | 2/2011 |
| JP | 2016-195005 A | 11/2016 |

(Continued)

OTHER PUBLICATIONS

An English translation of the International Search Report("ISR") of PCT/JP2019/002637 dated Mar. 26, 2019.
(Continued)

*Primary Examiner* — Kevin K Pyo
(74) *Attorney, Agent, or Firm* — Metrolex IP Law Group, PLLC

(57) ABSTRACT

The present invention achieves a multiple-optical-axis photoelectric sensor which can be assembled with reduced effort. A multiple-optical-axis photoelectric sensor (100) includes a light projector (110) and a light receiver (120) each having an outer shape defined by a housing (1) including: an outer case (10); a light-transmitting plate (15); and a pressing member (20). Supporting parts (11*b*) are provided at respective inner surfaces of side plates of the outer case. Extending parts (11*c*) are provided at end parts of the corresponding side plates. The pressing member is configured to press the light-transmitting plate against the supporting parts by being attached to the respective extending parts.

7 Claims, 5 Drawing Sheets

(58) Field of Classification Search
USPC .......................................................... 250/221
See application file for complete search history.

(56)    References Cited

U.S. PATENT DOCUMENTS

2018/0017435 A1* 1/2018 Yamaji ................. G01J 1/0403
2018/0017706 A1  1/2018 Nishiuchi et al.
2018/0052043 A1  2/2018 Kimura

FOREIGN PATENT DOCUMENTS

JP  2018-010789 A   1/2018
KR  10-0986716 B1   10/2010
WO  2011/013643 A1  2/2011

OTHER PUBLICATIONS

The Written Opinion ("WO") of PCT/JP2019/002637 dated Mar. 26, 2019.
Office Action dated Feb. 24, 2021 in a counterpart Korean patent application.

* cited by examiner

MULTIPLE-OPTICAL-AXIS PHOTOELECTRIC SENSOR

TECHNICAL FIELD

The present invention relates to a multiple-optical-axis photoelectric sensor including a light projector and a light receiver each having an outer shape defined by a housing including an outer case having an opening in a front surface of the outer case, a light-transmitting plate configured to close the opening, and a pressing member configured to press the light-transmitting plate against the outer case.

BACKGROUND ART

Patent Literature 1 discloses a photoelectric sensor including: a main body case; a light-transmitting plate; and a first pressing member for pressing and fixing the light-transmitting plate to the main body case. According to the photoelectric sensor, the main body case is provided with: (i) a first passage port for letting light pass therethrough; (ii) a pair of first attachment surfaces provided so as to sandwich the first passage port; (iii) a pair of first protruding parts protruding out of the body case with respect to the pair of first attachment surfaces; and (iv) a pair of engagement openings provided between the first mounting surfaces and the corresponding first protruding parts. The light-transmitting plate is attached to the first attachment surfaces to close the first passage port. The pressing member is attached to the pair of engagement openings so as to press a side of the light-transmitting plate, which side is opposite a side facing the first attachment surfaces.

CITATION LIST

Patent Literature

[Patent Literature 1]
Japanese Patent No. 4628402 (Publication date: Feb. 9, 2011)

SUMMARY OF INVENTION

Technical Problem

However, according to the photoelectric sensor disclosed in Patent Literature 1, the light-transmitting plate needs to be pressed temporarily with an excess force in a case where the pressing member is attached. This unfortunately requires excess effort to assemble the photoelectric sensor.

An object of an aspect of the present invention is to achieve a multiple-optical-axis photoelectric sensor which can be assembled with reduced effort.

Solution to Problem

In order to attain the object, a multiple-optical-axis photoelectric sensor in accordance with an aspect of the present invention is a multiple-optical-axis photoelectric sensor including a light projector and a light receiver each having an outer shape defined by a housing including an outer case having an opening in a front surface of the outer case, a light-transmitting plate configured to close the opening, and a pressing member configured to press the light-transmitting plate against the outer case, the outer case having a pair of side plates having respective inner surfaces at which supporting parts for supporting respective side edge parts of the light-transmitting plate are provided, the pair of side plates having respective extending parts each of which (i) is provided at an end part at which the opening is made and (ii) extends toward an end part of the other one of the pair of side plates, and the pressing member, which has first protruding parts and second protruding parts facing each other in directions in which a thickness of the light-transmitting plate extends, being configured to press the light-transmitting plate against the supporting parts by being attached to the extending parts such that the extending parts are each sandwiched between a corresponding one of the first protruding parts and a corresponding one of the second protruding parts.

Advantageous Effects of Invention

With an aspect of the present invention, it is possible to achieve a multiple-optical-axis photoelectric sensor which can be assembled with reduced effort.

DESCRIPTION OF EMBODIMENTS

Embodiment 1

The following description will discuss an embodiment according to an aspect of the present invention (hereinafter also referred to as "present embodiment") with reference to drawings. However, the present embodiment described below is merely illustrative of the present invention in all respects. It will be understood that various modifications and variations can be made without exceeding the scope of the present invention. In other words, in working the present invention, any specific configuration corresponding to the embodiment can be adopted as appropriate.

§ 1. Application Example

Figure 2:
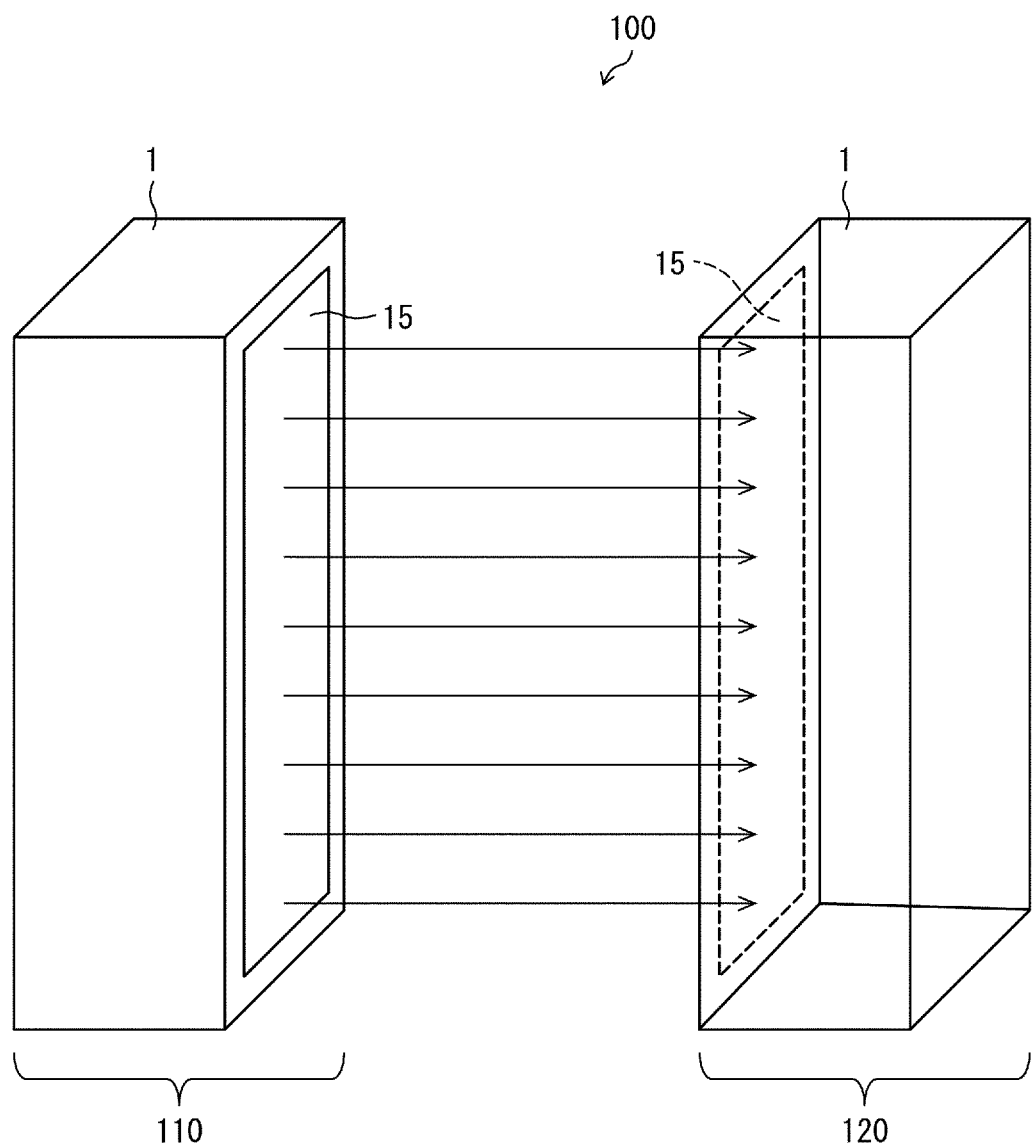
FIG. 2 is a view illustrating an overview of a multiple-optical-axis photoelectric sensor in accordance with Embodiment 1.

An example in which the present invention is applied will be described first with reference to FIGS. 2 and 3. FIG. 2 is a view illustrating an overview of a multiple-optical-axis photoelectric sensor 100 according to the present embodiment. As illustrated in FIG. 2, the multiple-optical-axis photoelectric sensor 100 includes a light projector 110 and a light receiver 120 which are provided so as to face each other with a certain detection region therebetween. As illustrated in FIG. 2, a plurality of optical axes are set between the light projector 110 and the light receiver 120 so that the multiple-optical-axis photoelectric sensor 100 detects an object according to how the optical axes are entering or blocked.

Figure 3:
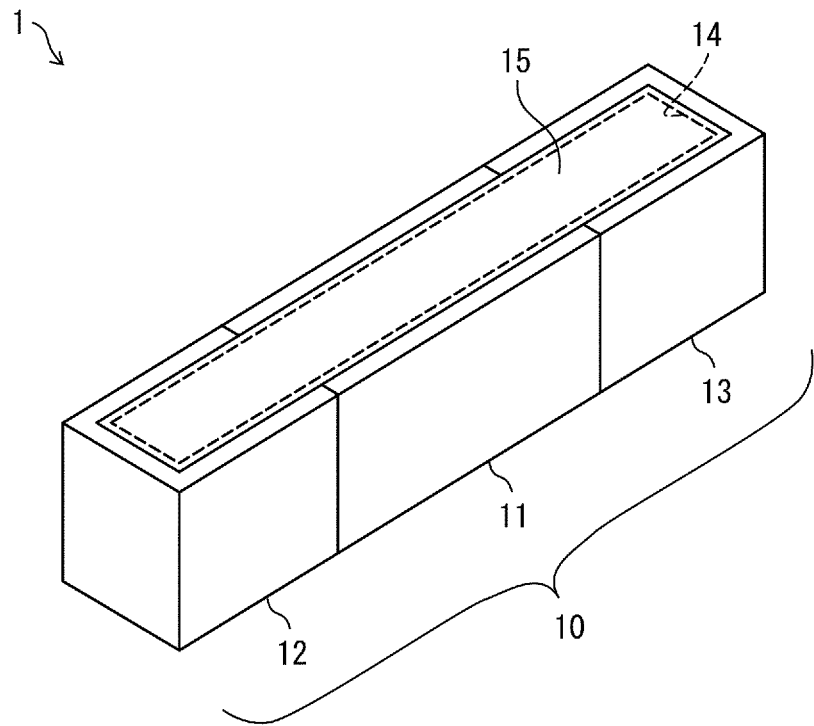
FIG. 3 is a view schematically illustrating the housing in accordance with Embodiment 1.

FIG. 3 is a view schematically illustrating a housing 1. The housing 1 is used as a housing of each of the light projector 110 and the light receiver 120. The housing 1 includes: a main body case 11; cap members 12 and 13; a light-transmitting plate 15; and a pressing member 20 (see FIG. 1). In FIG. 3, the pressing member 20 is omitted.

In the housing 1, as illustrated in FIG. 3, the main body case 11 and the cap members 12 and 13 constitute an outer case 10. Specifically, the outer case 10 is configured so that the cap members 12 and 13 are fitted into respective lengthwise end parts of the cylindrical main body case 11 having a rectangular cross section.

The outer case 10 has an opening 14 in one surface of the outer case 10. The opening 14 is closed by the light-transmitting plate 15. The light-transmitting plate 15 is pressed against the housing 1 by the pressing member 20. In the following description, the surface of the housing 1, which surface has the opening 14 therein, will be referred to as "front surface". The direction from the inside of the housing 1 toward the front surface will be described with the term "frontward" or "front side".

The opening 14 can be made over all of the main body case 11 and the cap members 12 and 13 as illustrated in FIG. 3. However, the opening 14 can be made only in the main body case 11. That is, the opening 14 need only be made at least in the main body case 11.

The multiple-optical-axis photoelectric sensor 100 can be expressed as follows. The multiple-optical-axis photoelectric sensor 100 is configured so that respective outer shapes of the light projector 110 and the light receiver 120 are each defined by a housing 1 (which includes: an outer case 10 having an opening 14 in a front surface thereof; a light-transmitting plate 15 provided so as to close the opening 14; and a pressing member 20 provided so as to press the light-transmitting plate 15 against the housing 1).

§ 2. Configuration Example

Figure 1:
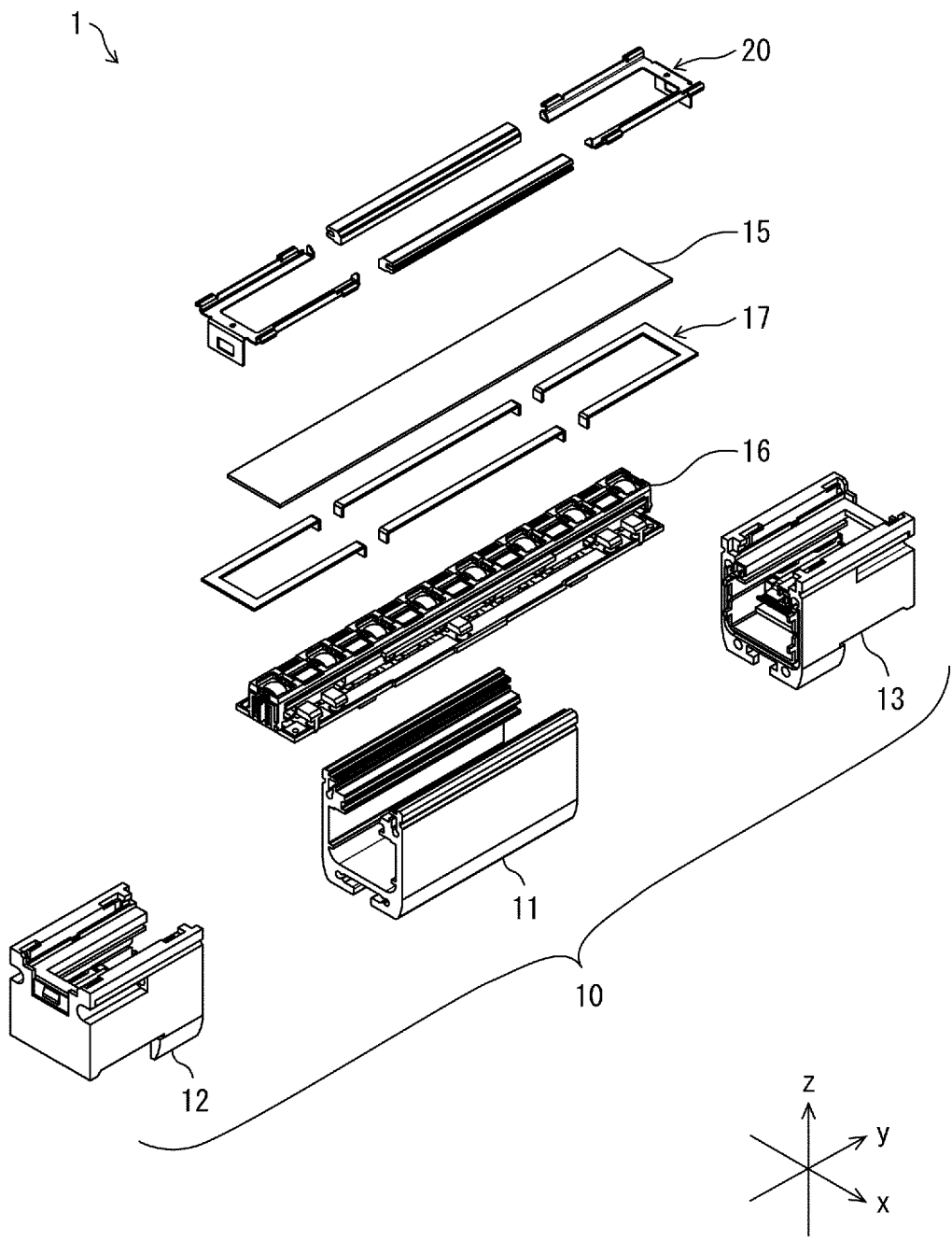
FIG. 1 is a development view illustrating a configuration of a housing in accordance with Embodiment 1.
Figure 4:
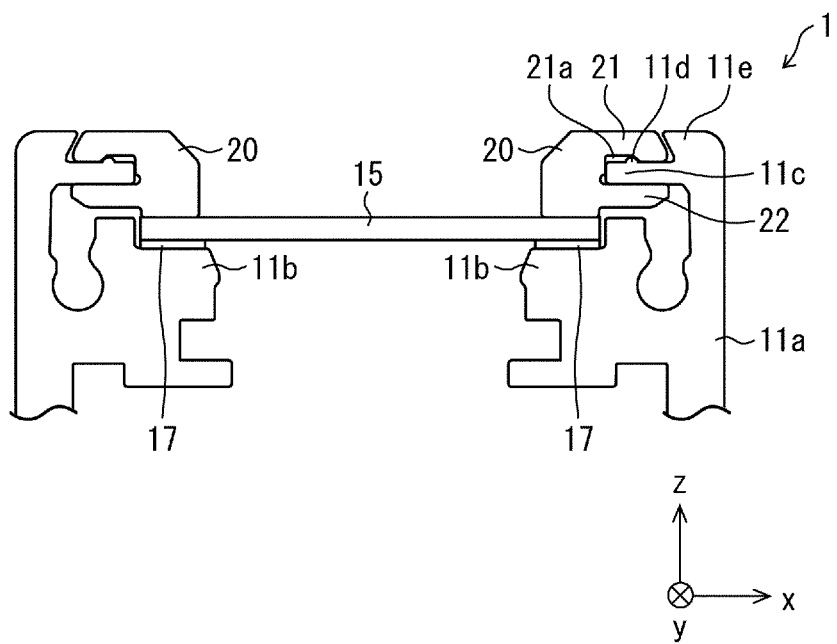
FIG. 4 is a partial cross-sectional view illustrating a structure of the housing in accordance with Embodiment 1.

An example of the configuration of the housing 1 will be described below with reference to FIGS. 1 and 4. In FIGS. 1 and 4, a widthwise direction of the housing 1 is defined as an x direction, a lengthwise direction is defined as a y direction, and front-rear directions are defined as z directions. In particular, the frontward direction of the housing 1 is defined as a positive z direction.

FIG. 1 is a development view illustrating the configuration of the housing 1 according to the present embodiment. As described above, the housing 1 is configured so that the cap members 12 and 13 are fitted into the respective lengthwise end parts of the main body case 11.

In the housing 1, an optical element 16 is contained. In a case where the housing 1 is used as a light projector 110, the optical element 16 is a light emitting element. In a case where the housing 1 is used as a light receiver 120, the optical element 16 is a light receiving element. At least one of the cap members 12 and 13 is provided with a connector (not illustrated) for supplying electric power to the optical element 16 or for extracting a signal from the optical element 16.

The housing 1 further includes an adhesive tape 17 (adhesive material). The light-transmitting plate 15 is provided so as to close the opening 14 from the front side of the adhesive tape 17. The pressing member 20 is attached to the front side of the light-transmitting plate 15. The specific positions and the like of the adhesive tape 17 and the pressing member 20 will be described later.

The length of the main body case 11 varies, depending on a form in which the multiple-optical-axis photoelectric sensor 100 is applied. According to the multiple-optical-axis photoelectric sensor 100, the main body case 11 can have any length by cutting the adhesive tape 17 (having a sufficient length) according to the length of the main body case 11.

FIG. 4 is a partial cross-sectional view illustrating a structure of the housing 1. Specifically, FIG. 4 is a cross-sectional view of the housing 1, taken at a surface which (i) is perpendicular to the lengthwise direction of the housing 1 and (ii) includes the main body case 11. As illustrated in FIG. 4, the main body case 11 includes a pair of side plates 11*a* on respective sides in the widthwise direction. At respective inner surfaces of the side plates 11*a*, corresponding supporting parts 11*b* for supporting both side edge parts of the light-transmitting plate 15 are provided. The cap members 12 and 13 are also provided with supporting parts (not illustrated) which are continuous with the supporting parts 11*b*. According to the present embodiment, the adhesive tape 17 is provided on front sides of the supporting parts 11*b*. The adhesive tape 17 causes the light-transmitting plate 15 to adhere to the supporting parts 11*b*.

Respective end parts of the side plates 11*a*, at which the opening 14 is provided, are provided with corresponding extending parts 11*c* each extending toward the end part of the other side plate 11*a*. The pressing member 20 is attached to the extending parts 11*c*.

Specifically, the housing 1 is configured so that the pressing member 20 includes first protruding parts 21 and second protruding parts 22. The first protruding parts 21 and the second protruding parts 22 face each other in directions in which the thickness of the light-transmitting plate 15 extends. The first protruding parts 21 and the second protruding parts 22 are provided substantially over the entire length of the main body case 11. The first protruding parts 21 are positioned further frontward than are the second protruding parts 22 while the pressing member 20 is being attached to the extending parts 11*c*. The pressing member 20 presses the light-transmitting plate 15 against the supporting parts 11*b* by being attached to the extending parts 11*c* such that the extending parts 11*c* are sandwiched between the first protruding parts 21 and the second protruding parts 22. In particular, in the present embodiment, the pressing member 20 is attached to the extending parts 11*c* by moving parallel to the front surface of the housing 1. Therefore, in a case where the pressing member 20 is attached, it is unnecessary to press the light-transmitting plate 15 with a force greater than or equal to a pressing force applied by the attached pressing member 20. This reduces effort which is required for assembling the multiple-optical-axis photoelectric sensor 100 including the housing 1.

Because the light-transmitting plate 15 is pressed by the pressing member 20, a gap between the light-transmitting plate 15 and the supporting parts 11*b* is small. This restricts entrance of liquid such as oil into the housing 1. In particular, according to the housing 1 of the present embodiment, a space between the light-transmitting plate 15 and the supporting parts 11*b* is sealed by the adhesive tape 17. This further restricts the entrance of liquid in comparison with a housing including no adhesive tape 17.

In the present embodiment, a distance between respective tips of the pair of extending parts 11*c* is greater than a width of the light-transmitting plate 15. Therefore, in a case where the housing 1 is assembled, it is possible to place the light-transmitting plate 15 on the supporting parts 11b from the front side of the outer case 10.

At a surface of each extending part 11c which surface faces the corresponding first protruding part 21, a first protrusion 11d is provided. At a surface of each first protruding part 21 which surface faces the corresponding extending part 11c, a recess 21a is provided so that the corresponding first protrusion 11d is to be engaged with the recess 21a. The recess 21a is provided so as to correspond to the position of the first protrusion 11d in a case where the pressing member 20 is properly attached to the extending part 11c.

Therefore, in a case where the pressing member 20 is not properly attached to the extending part 11c, the first protruding part 21 is upraised from the extending part 11c. Therefore, in a case where the pressing member 20 is not properly attached to the extending part 11c, it is easy to visually observe that the pressing member 20 is not properly attached to the extending part 11c.

Note that according to the housing 1 of the present embodiment, the first protruding parts 21 can be provided with the first protrusions 11d, and the extending parts 11c can be provided with the recesses 21a. Furthermore, (i) each first protrusion 11d can be provided at a surface of the corresponding extending part 11c, which surface faces the corresponding second protruding part 22 and (ii) each recess 21a can be provided at a surface of the corresponding second protruding part 22, which surface faces the corresponding extending part 11c. That is, the housing 1 in accordance with the present embodiment need only be configured so that the first protrusion 11d and the recess 21a, with which the first protrusion 11d is to be engaged, are provided at the following surface A and the following surface B, respectively, or provided at the following surface B and the following surface A, respectively. The surface A is a surface of the extending part 11c, which surface faces the first protruding part 21 or the second protruding part 22. The surface B is a surface of the first protruding part 21 or of the second protruding part 22, which surfaces faces the extending part 11c. With the housing 1, it is possible to properly determine a position at which the pressing member 20 is to be attached to the extending parts 11c.

Furthermore, the side plates 11a each have an engagement part 11e which is to be engaged with the corresponding first protruding part 21 (an end part of the pressing member) and which is provided further away from the light-transmitting plate 15 than is the corresponding extending part 11c. Specifically, as illustrated in FIG. 4, the engagement part 11e is inclined so as to be, in a frontward direction from the extending part 11c, increasingly closer to a widthwise center of the main body case 11. A tip part of the first protruding part 21 is also inclined so that while the pressing member 20 is being attached to the extending part 11c, the tip part is, in a frontward direction, increasingly closer to the widthwise center of the main body case 11. This reduces a risk of the first protruding part 21 being upraised from the extending part 11c even in a case where, after the pressing member 20 is properly attached to the extending part 11c, the pressing member 20 is deformed so that a distance between the first protruding part 21 and the second protruding part 22 is increased.

§ 3. Variations

Figure 5:
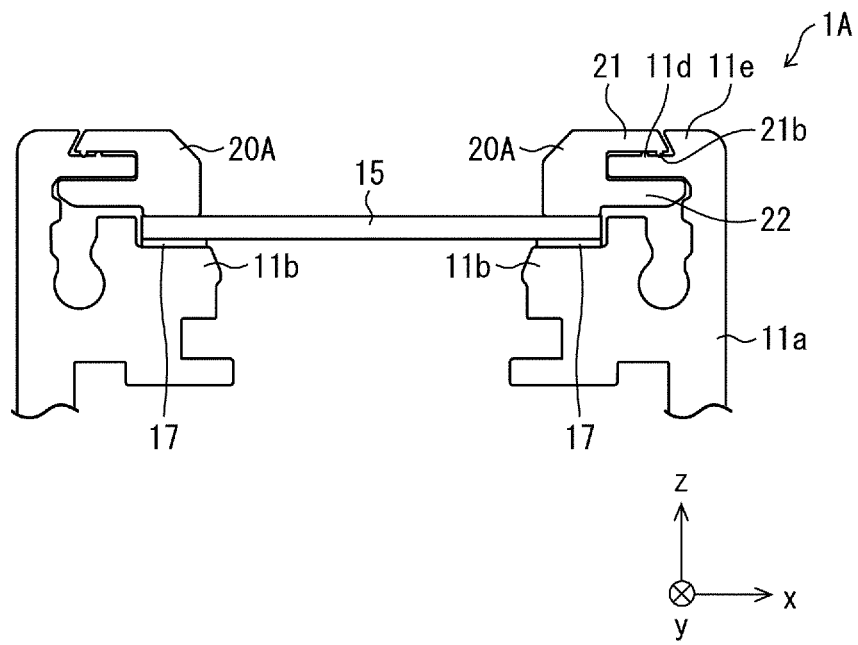
FIG. 5 is a partial cross-sectional view illustrating a structure of a housing in accordance with Variation 1.

FIG. 5 is a partial cross-sectional view illustrating a structure of a housing 1A according to Variation 1. The housing 1A differs from the housing 1 in that the housing 1A includes a pressing member 20A instead of the pressing member 20. The pressing member 20A differs from the pressing member 20 in that the pressing member 20A has second protrusions 21b each provided at a surface of a corresponding first protruding part 21, which surface faces a corresponding extending part 11c.

According to the pressing member 20A, the first protruding parts 21 are each in contact with the corresponding extending part 11c only at the second protrusion 21b. Therefore, in the process of attaching the pressing member 20A to the extending parts 11c, a force of friction generated between the first protruding parts 21 and the extending parts 11c is smaller than a force of friction generated in the process of attaching the pressing member 20 to the extending parts 11c. In other words, the force required to attach the pressing member 20A to the extending parts 11c is less than the force required to attach the pressing member 20 to the extending parts 11c. A multiple-optical-axis photoelectric sensor including the housing 1A is therefore easier to assemble in comparison with the multiple-optical-axis photoelectric sensor 100 including the housing 1.

The second protrusions 21b are each provided at a surface facing a surface of the corresponding extending part 22c, which surface is provided with the first protrusion 11d. In addition, the second protrusions 21b are provided further out widthwise than are the first protrusions 11d while the pressing member 20A is being attached to the extending parts 11c. This causes the second protrusion 21b to be caught by the corresponding first protrusion 11d in a case where the pressing member 20A moves in a direction so as to be detached from the extending part 11c. Therefore, unintentional detachment of the pressing member 20A from the extending part 11c is restricted.

In Variation 1, it is only necessary that the second protrusion 21b is provided at a surface of the first protruding part 21 or of the second protruding part 22, which surface faces a surface of the extending part 11c, which surface has the first protrusion 11d. That is, assume a case where the first protrusion 11d is provided at the surface of the extending part 11c, which surface faces the second protruding part 22. In this case, the second protrusion 21b is provided at the surface of the second protruding part 22, which surface faces the surface of the extending part 11c at which the first protrusion 11d is provided.

Figure 6:
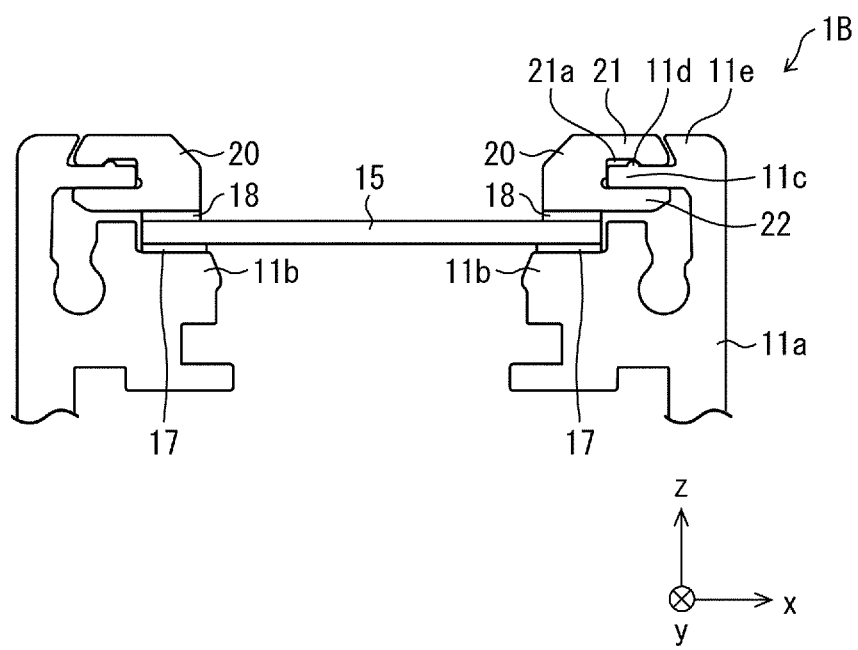
FIG. 6 is a partial cross-sectional view illustrating a structure of a housing in accordance with Variation 2.

FIG. 6 is a partial cross-sectional view illustrating a structure of a housing 1B according to Variation 2. The housing 1B differs from the housing 1 in that the housing 1B includes elastic members 18 between the pressing member 20 and light-transmitting plate 15. The elastic members 18 each have a rectangular cross section as illustrated in FIG. 6. Specifically, the elastic members 18 are, for example, flat rubbers.

According to the housing 1B, the pressing member 20 presses the light-transmitting plate 15 with the elastic members 18 therebetween. According to the housing 1B, therefore, the light-transmitting plate 15 is pressed more strongly due to elasticity of the elastic members 18. Consequently, the adhesive tape 17 is pressed more strongly. This reduces a risk of exposing the optical element 16 (see FIG. 1) to liquid such as oil. In addition, because a space between the pressing member 20 and light-transmitting plate 15 is sealed by the elastic members 18, a risk of exposing the adhesive tape 17 to liquid is also reduced.

Figure 7:
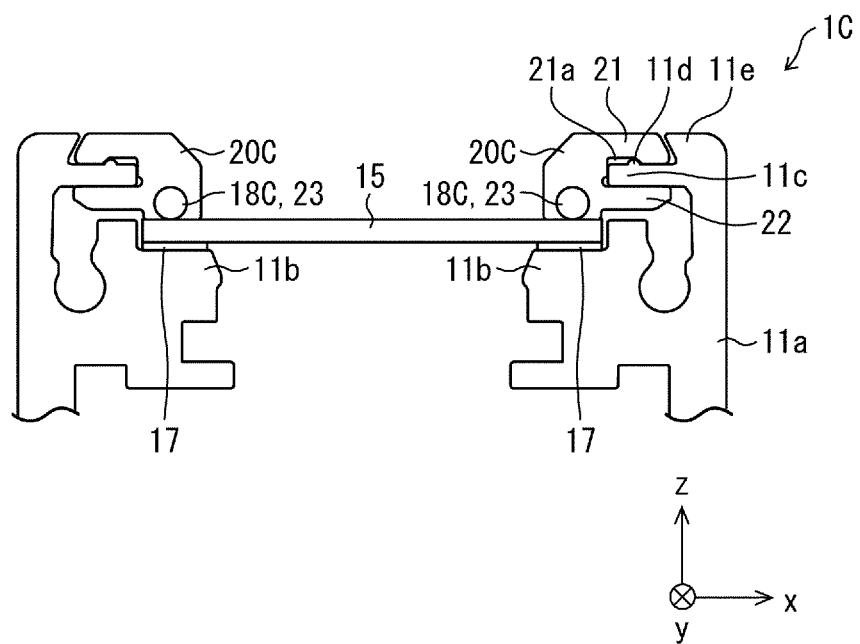
FIG. 7 is a partial cross-sectional view illustrating a structure of a housing in accordance with Variation 3.

FIG. 7 is a partial cross-sectional view illustrating a structure of a housing 1C according to Variation 3. As illustrated in FIG. 7, the housing 1C differs from the housing 1B in that (i) the housing 1C includes elastic members 18C instead of the elastic members 18, and (ii) the housing 1C includes a pressing member 20C instead of the pressing member 20. The elastic members 18C differ from the elastic members 18 in that the shape of a cross section of each elastic member 18C is circular instead of rectangular. The pressing member 20C differs from the pressing member 20 in that the pressing member 20C has grooves 23 into which the respective elastic members 18C are to be fitted.

The depth of each groove 23 is greater than a radius of the cross section of the corresponding elastic member 18C, and is less than a diameter of the cross section of the elastic member 18C. The cross section of the groove 23 has a shape corresponding to the cross section of the elastic member 18C. That is, (i) the width of the groove 23 at a surface of the pressing member 20C is less than the diameter of the elastic member 18C and (ii) the groove 23 has a part which falls within the pressing member 20C, the width of which part is substantially equal to the diameter of the elastic member 18C. Therefore, the elastic member 18C fitted into the groove 23 is unlikely to be detached from the groove 23 due to gravity or the like. Note that the elastic member 18C has elasticity. Therefore, by changing the shape of the elastic member 18C by pressure, it is possible to fit the elastic member 18C into the groove 23 having the width narrower than the diameter of the elastic member 18C which is not changed in shape.

According to the housing 1C, the pressing member 20C presses the light-transmitting plate 15 with the elastic members 18C therebetween. With the housing 1C, the following effect can be obtained in addition to effect obtained with the housing 1B. That is, by fitting the elastic members 18C into the respective groove 23 in advance when the housing 1C is assembled, it is no longer necessary to consider positions of the elastic members 18C when the pressing member 20C is attached to the extending parts 11c. A multiple-optical-axis photoelectric sensor including the housing 1C is therefore easier to assemble in comparison with a multiple-optical-axis photoelectric sensor including the housing 1B.

The present invention is not limited to the embodiment, but can be altered by a skilled person in the art within the scope of the claims. The present invention also encompasses, in its technical scope, any embodiment derived by combining technical means disclosed in differing embodiments.

(Recap)

As has been described, a multiple-optical-axis photoelectric sensor in accordance with an aspect of the present invention is a multiple-optical-axis photoelectric sensor including a light projector and a light receiver each having an outer shape defined by a housing including an outer case having an opening in a front surface of the outer case, a light-transmitting plate configured to close the opening, and a pressing member configured to press the light-transmitting plate against the outer case, the outer case having a pair of side plates having respective inner surfaces at which supporting parts for supporting respective side edge parts of the light-transmitting plate are provided, the pair of side plates having respective extending parts each of which (i) is provided at an end part at which the opening is made and (ii) extends toward an end part of the other one of the pair of side plates, and the pressing member, which has first protruding parts and second protruding parts facing each other in directions in which a thickness of the light-transmitting plate extends, being configured to press the light-transmitting plate against the supporting parts by being attached to the extending parts such that the extending parts are each sandwiched between a corresponding one of the first protruding parts and a corresponding one of the second protruding parts.

According to the configuration, the light-transmitting plate is supported by the supporting parts each provided at the inner surface of the corresponding side plate of the outer case so as to extend toward the end part of the other side case. The pressing member is attached to the end parts of the outer case so that the extending parts are each sandwiched between the corresponding first protruding part and the corresponding second protruding part.

While the pressing member is being attached to the extending parts, the pressing member presses, with proper pressure, the light-transmitting plate which is supported by the supporting parts provided at the inner surfaces of the outer case. In this way, it is unnecessary to press the light-transmitting plate with excessive pressure in a case where the pressing member is to be attached. This reduces effort to assemble the multiple-optical-axis photoelectric sensor.

The multiple-optical-axis photoelectric sensor in accordance with an aspect of the present invention is configured so that a first protrusion and a recess, with which the first protrusion is to be engaged, are provided at a surface A and a surface B, respectively, or provided at a surface B and a surface A, respectively, the surface A being a surface of each of the extending parts, which surface faces a corresponding one of the first protruding parts or a corresponding one of the second protruding parts, and the surface B being a surface of one of the first protruding parts or of one of the second protruding parts of the pressing member, which surface faces a corresponding one of the extending parts.

According to the configuration, the first protrusions are engaged with the corresponding recesses in a case where the pressing member is attached to the extending parts. This makes it possible to properly determine positions at which the pressing member is to be attached to the extending parts.

The multiple-optical-axis photoelectric sensor in accordance with an aspect of the present invention is configured so that: a first protrusion is provided at a surface C which is a surface of each of the extending parts, which surface faces a corresponding one of the first protruding parts or a corresponding one of the second protruding parts; and a second protrusion is provided at a surface of the corresponding one of the first protruding parts or of the corresponding one of the second protruding parts of the pressing member, which surface faces the surface C.

According to the configuration, an area of a region, at which the extending parts and the pressing member are in contact with each other, is small in the process of attaching the pressing member to the extending parts. This causes a force of friction between the extending parts and the pressing member to be small. Therefore, a force required to attach the pressing member to the extending parts is made small. This further reduces effort to assemble the multiple-optical-axis photoelectric sensor.

The multiple-optical-axis photoelectric sensor in accordance with an aspect of the present invention is configured so that the pair of side plates of the outer case each have an engagement part which is configured to be engaged with a corresponding end part of the pressing member and which is provided so as to be further away from the light-transmitting plate than is a corresponding one of the extending parts.

According to the configuration, the end part of the protruding part of the pressing member, which end part is on the side further away from the light-transmitting plate, is engaged with the engagement part. This reduces a risk that after the pressing member is attached to the extending parts, the pressing member is upraised from the extending parts due to deformation of the pressing member.

The multiple-optical-axis photoelectric sensor in accordance with an aspect of the present invention is configured so that the pressing member is configured to press the light-transmitting plate with an elastic member therebetween.

According to the configuration, the light-transmitting plate is pressed more strongly due to elasticity of the elastic members.

The multiple-optical-axis photoelectric sensor in accordance with an aspect of the present invention further includes: an adhesive material which causes the light-transmitting plate to adhere to the supporting parts.

According to the configuration, the inside of the housing is sealed in a case where the adhesive material is pressed by a pressing force of the pressing member. This restricts, for example, entrance of oil into the housing.

The multiple-optical-axis photoelectric sensor in accordance with an aspect of the present invention is configured so that the pressing member is configured to be attached to each of the extending parts by being moved in a direction parallel to a direction in which the front surface extends.

According to the configuration, it is made unnecessary to apply a force perpendicular to the front surface in a case where the pressing member is to be attached. This reduces effort to assemble the multiple-optical-axis photoelectric sensor.

REFERENCE SIGNS LIST 1, 1A, 1B, 1C Housing
10 Outer case
11b Supporting part
11c Extending part
11d First protrusion
14 Opening
15 Light-transmitting plate
17 Adhesive tape (adhesive material)
18, 18C Elastic member
20 Pressing member
21 First protruding part
21a Recess
22 Second protruding part
100 Multiple-optical-axis photoelectric sensor
110 Light projector
120 Light receiver

The invention claimed is:

1. A multiple-optical-axis photoelectric sensor comprising a light projector and a light receiver each having an outer shape defined by a housing including
   an outer case having an opening in a front surface of the outer case,
   a light-transmitting plate configured to close the opening, and
   a pressing member configured to press the light-transmitting plate against the outer case,
   the outer case having a pair of side plates having respective inner surfaces at which supporting parts for supporting respective side edge parts of the light-transmitting plate are provided,
   the pair of side plates having respective extending parts each of which (i) is provided at an end part at which the opening is made and (ii) extends toward an end part of the other one of the pair of side plates, and
   the pressing member, which has first protruding parts and second protruding parts facing each other in directions in which a thickness of the light-transmitting plate extends, being configured to press the light-transmitting plate against the supporting parts by being attached to the extending parts such that the extending parts are each sandwiched between a corresponding one of the first protruding parts and a corresponding one of the second protruding parts.

2. The multiple-optical-axis photoelectric sensor according to claim 1, wherein
   a first protrusion and a recess, with which the first protrusion is to be engaged, are provided at a surface A and a surface B, respectively, or provided at a surface B and a surface A, respectively,
   the surface A being a surface of each of the extending parts, which surface faces a corresponding one of the first protruding parts or a corresponding one of the second protruding parts, and
   the surface B being a surface of one of the first protruding parts or of one of the second protruding parts, which surface faces a corresponding one of the extending parts.

3. The multiple-optical-axis photoelectric sensor according to claim 1, wherein:
   a first protrusion is provided at a surface C which is a surface of each of the extending parts, which surface faces a corresponding one of the first protruding parts or a corresponding one of the second protruding parts; and
   a second protrusion is provided at a surface of the corresponding one of the first protruding parts or of the corresponding one of the second protruding parts, which surface faces the surface C.

4. The multiple-optical-axis photoelectric sensor according to claim 2, wherein
   the pair of side plates of the outer case each have an engagement part which is configured to be engaged with a corresponding end part of the pressing member and which is provided so as to be further away from the light-transmitting plate than is a corresponding one of the extending parts.

5. The multiple-optical-axis photoelectric sensor according to claim 1, wherein
   the pressing member is configured to press the light-transmitting plate with an elastic member therebetween.

6. The multiple-optical-axis photoelectric sensor according to claim 1, further comprising:
   an adhesive material which causes the light-transmitting plate to adhere to the supporting parts.

7. The multiple-optical-axis photoelectric sensor according to claim 1, wherein
   the pressing member is configured to be attached to each of the extending parts by being moved in a direction parallel to a direction in which the front surface extends.

* * * * *